United States Patent Office 3,667,968
Patented June 6, 1972

3,667,968
CHEESE FLAVORS
Robert L. Kasik, Oak Lawn, and Anthony J. Luksas, Chicago, Ill., assignors to Beatrice Foods Co., Chicago, Ill.
No Drawing. Continuation-in-part of application Ser. No. 824,250, May 13, 1969. This application May 13, 1969, Ser. No. 824,259
Int. Cl. A23c 19/02, 19/12; A23l 1/26
U.S. Cl. 99—140 R                                    34 Claims

ABSTRACT OF THE DISCLOSURE

Cheese flavors and cheese flavored products are produced in a short time by growing a combination of one member of the genus Bacillus and one member of the genus Streptococcus in an aqueous medium containing a protein and a carbohydrate to produce a ferment. The resulting ferment is inoculated with specific cheese flavor organisms such as *Penicillium roquefortii* and further fermented. The product is then formed into a cheese or dried to a powder, as desired.

---

This is a continuation-in-part of copending application Ser. No. 824,250, filed on May 13, 1969 entitled "Production of Cheese Flavor."

The present invention relates to the production of cheese flavors and cheese flavored products. More particularly, the present invention relates to a method and composition for the production of specific cheese flavors, especially cheese flavors for producing cheese and cheese flavored products.

Cheese is widely used by the consumer in many forms. For example, cheese itself is consumed as an end product, but also cheese or cheese flavors may be in a dried form or contained in salad dressings, dips, sauces and the like. Due to the wide consumer acceptance of cheese flavors, there is a great demand for such products. However, cheese is a relatively expensive product due mostly to the long processing time required to produce the cheese and develop the distinctive flavors. Under the circumstances, it would be highly desirable to accelerate the production of cheese and the development of the cheese flavors so that cheese or cheese flavored products could be manufactured in a much shorter time and thereby decreasing the cost thereof.

Accordingly, it is an object of this invention to provide a method of producing cheese, cheese flavors and cheese flavored products which requires considerably less time than the normal production methods. It is a further object of this invention to provide a composition for the production of cheese flavors, which composition will allow the development of cheese flavors in a relatively short time. Other objects will be apparent from the following disclosure and claims.

A common method of producing cheese is that of heating milk to a certain temperature below the sterility point, cooling the milk, causing the milk to form curds, separating the curds from the whey, pressing the curds into a mass and allowing the mass to age for some extended time in order to develop the cheese flavor. This process has been used for producing cheeses for centuries and the exact mechanism by which the flavors are developed has never been fully explained. It has been assumed in the art that various organisms present or introduced during the cheese making process slowly produce the various cheese flavors. However, as is also known in the art, there are a host of various organisms in milk, both the organisms naturally occurring in the milk and the organisms which are present due to contamination.

As disclosed in the aforementioned application, it was discovered that particular organisms are responsible for the development of a basic cheese flavor. This discovery allowed the isolation of these organisms and the growth thereof under conditions favorable for their rapid development. The organisms can thus be produced in a relatively short time with the development of a basic cheese flavor. According to the invention of that application a composition is provided which will allow a rapid development of these organisms and this composition may be used to produce various cheese flavors directly or as an inoculant for the production of various cheese flavors from another source.

The composition of that application comprises an aqueous medium having at least one protein and at least one carbohydrate therein and wherein the medium contains at least ten organisms per gram of the medium of at least one member of the genus Bacillus and at least ten organisms per gram of the medium of at least one member from the genus Streptococcus. The proteins which may be utilized by the organisms are not critical and may be, for example, animal proteins, e.g. milk, or vegetable proteins, e.g. soy bean protein, and like vegetable proteins. The organisms are non-sensitive to the particular protein and carbohydrate. Likewise the particular percentage of protein and carbohydrate in the aqueous medium is not critical, but from .5 gram of protein per 100 grams of aqueous medium and from .5 gram of carbohydrate per 100 grams of aqueous medium to 35 grams of protein and 35 grams of carbohydrate per 100 grams of aqueous medium are suitable, especially 1 gram of protein and 1 gram of carbohydrate to 7.5 grams of protein and 5.5 grams of carbohydrate. Milk itself provides quite suitable proteins and carbohydrates in the above ranges and is, therefore, a suitable medium for growing the organisms. However, it is not necessary to use only milk, since other milk fractions or products may be used, for example, cream, whole milk, skim milk, milk solids (total milk solids or non-fat milk solids and like fractions or products).

While any non-toxic member of the genus Bacillus and the genus Streptococcus may be used, according to the above-mentioned application, to produce a cheese flavor, it was found that the degree and distinctiveness of the flavor developed varies with the particular members chosen. In other words, by choosing a particular member or members from each of the two groups varying degrees and distinctiveness of a cheese flavor can be obtained. Hence, certain combinations of the organisms from the genus Bacillus and genus Streptococcus will produce a cheddar cheese flavor. For example, if it is desired to produce a high degree and distinctiveness of a cheddar cheese flavor, the organisms which were found best for this purpose, from the genus Bacillus were *alvei, cereus, cereus* var.

*mycoides, megaterium, megatherium, subtilis, subtilis* var. *aterrimus, subtilis* var. *niger*, and from the genus Streptococcus were *cermoris, durans, faecalis, lactis*. Also within this group, a certain combination produces quite superior results in terms of the degree and distinctiveness of the cheddar flavor developed. Accordingly, that combination was considered to be a best mode of the invention. The combination was the organisms *megaterium* and *megatherium* from the genus Bacillus and the organisms *S. lactis*-variation *diacetilactis* (citrate fermenter) and *S. lactis-diacetilactis* (citrate non-mermenter) from the genus Streptococcus.

It has now been discovered, however, that specific cheese flavors, other than a cheddar flavor, may be produced. Broadly speaking, the present improvement resides in inoculating the ferment of the above mentioned application with an organism which upon further fermentation will produce a specific cheese flavor, whereby both the basic cheesy flavor of the aforementioned application and the specific flavor of a specific cheese are obtained together.

As noted in the aforementioned application, the cheese or cheese flavor may be produced directly from a composition or a composition may be prepared for inoculating a medium for producing the cheese or cheese flavor. Also as noted in that application, the protein and carbohydrates may be chosen as desired, but it is most convenient to use milk, a milk fraction or a milk product. In this regard, skim milk is quite suitable as a medium. The milk medium must have not less than 4% and not greater than 35% total solids, the remainder being essentially water and the dissolved natural constituents of milk. This medium is heated from at least 145° F. for 30 minutes, i.e. pasteurization, to 295° F. for 15 seconds, or to sterility at any temperature and time, which processes are well known in the art. When the medium is heated to within such temperature and time ranges the organisms occurring in the medium will be substantially killed or retarded to a point that they are prevented from competing with the organisms introduced to produce the basic cheese flavor. Under the circumstances, the heating step is quite critical. The medium is then cooled to 130° F. or below and preferably below 100° F. The medium however must be maintained above 60° F. and preferably above 85° F. While the medium is maintained within the above-noted temperature range, it is inoculated with at least ten organisms of the genus Bacillus and at least ten organisms of the genus Streptococcus per gram of medium. More preferably, at least 100 organisms of each genus are placed in the medium and for best results at least 1000, e.g., 10,000 or more organisms of each genus are placed in the medium. While the ratio of the organisms from the genus Bacillus and the genus Streptococcus is not narrowly critical, it is preferred that the ratio be between 25:75 to 75:25 (Bacillus to Streptococcus). Preferably the media with the inoculant therein are stirred sufficiently to distribute the organisms throughout the media. The stirring is, however, not critical since the organisms will naturally distribute throughout the media within a reasonable amount of time. The inoculated medium is then sealed in an airtight container, e.g., by capping or flushing the head space of the container with an inert gas such as nitrogen, and maintained within the above-noted temperature range for 3 to 5 days during which a fermentation process takes place. Of course, if desired, longer times may be used, but the growth of the organisms tapers off considerably after five days and very little advantage is obtained in allowing the organisms to grow beyond a period of five days. The flush of nitrogen or the use of a sealed container is necessary, since the process must be carried out under microaerophillic conditions.

The inoculant used in the above procedure may be prepared in a similar manner, as disclosed in the aforementioned application. However, in producing the inoculant, the growth of the organisms must be continued until a symbiotic relationship is established. This time can vary depending upon the particular organisms of the genera which are actually used and upon the care and control exercised in the growth process. However, under usual conditions and care, the symbiotic relationship will usually be established in 25 to 35 days. However, shorter or longer periods may be used and the exact time is not critical so long as a symbiotic relationship is established. Once the symbiotic relationship is established, the medium is then suitable for inoculating large batches of milk or other media containing the protein and carbohydrate for producing cheese or the cheese flavors, as desired.

As disclosed in that application, after the organisms have been allowed to grow as disclosed above, the product obtained thereby may be used in any desired way for providing the cheese flavor. For example, the product may be concentrated to produce a high degree and distinctiveness of cheddar flavor, when the organisms noted above in connection with the cheddar cheese flavor are used as the inoculant or it may be pasteurized and dried as a cheese flavored powder or it may be used to mix with an unaged cheese base or naturally aged cheese to make a flavored cheese or cheese product.

However, according the present improvement, instead of using the ferment alone or mixing with a base such as naturally produced cheese, the ferment is inoculated with specific organisms to also produce a specific cheese flavor. The inoculant may be the specific organisms responsible for producing the specific cheese flavor, e.g. *Penicillium roquefortii* (blue cheese) and Proprionobacter (Swiss cheese), or it may be simply a small amount of the desired natural cheese which will, of course, have the natural flavor producing organisms therein. Only enough inoculant to start the further fermentation is required. This amount is of course quite small, e.g. 10 to 100 or more organisms per gram of ferment (either isolated organisms or those contained in a natural cheese).

The inoculated ferment is then further fermented for at least 2 days and will be essentially complete within 20 days, especially 14 or 12 days. However, longer fermenting times can be used if desired, but little further flavor will develop with extended fermentation time.

The further fermenting is carried out at about 40° to about 130° F. depending on the particular natural cheese or cheese producing organism used in the inoculation step. The conditions of the further ferment should follow that known in the art for fermenting the natural cheese, e.g. use aeration when fermenting with *Penicillium roquefortii*, anaerobic to microaerophillic conditions for Italian cheese (reduced oxygen tension), all of which is well known in the art and no further details are considered necessary. See for example: Sammis, J. L., "Cheese Making," The Cheese Maker Book Co., Madison, Wis. (1948) and Kirk-Othmer, "Encyclopedia of Chemical Technology," Interscience Pub., 2nd Ed. (1967), vol. 13.

After this further fermentation, the resulting ferment may be a suspension of small particles, small curds or near a solution in the case of high proteolytic cheeses and will depend on the particular inoculant for further fermentation.

This suspension may be used directly as a liquid flavor composition without further processing, other than pasteurization, to prevent any more fermentation or the composition may be spray dried with or without pasteurization to produce a powdered flavor composition. Alternately, the solids may be separated from the unpasteurized ferment (optionally pressed to remove excess whey) and allowed to age at about 40° F. to about 100° F. for at least about 5 days and up to a year or more, if desired. Good flavor will be produced, however, generally within 30 days. This will produce a full bodied cheese of excellent flavor. Alternately, the separated (optionally pressed) solids may be not aged at all or aged for a few days, e.g. 3 to 7 days and then dried, e.g. spray dried, to produce a highly flavored cheese powder. Yet also, the pressed solids, either with no aging or slight aging may be mixed with an edible base (either liquid or solid) and packaged as cheese flavored product or optionally dried, e.g. spray dried to a powder. Suitable edible bases are, for example, a natural or synthetic cheese, an animal or vegetable fat or protein, vegetable oil (liquid or hydrogenated) or a milk product or fraction (whey, dried milk solids, milk curds, etc.). However, before the further ferment is packaged as a flavoring composition or mixed with any other edible base or the solids separated therefrom to produce a cheese flavored product, as noted above, the ferment should be pasteurized, e.g. at 145° F. for about 30 minutes or to sterility at any temperature, e.g. 155° F. to 190° F. for 15 seconds, as is well known in the art. In other words, where no further development of flavor or further activity of the organisms in the ferment is desired, the ferment should be pasteurized. Hence, when the ferment is to be used as a liquid flavor or the separated solids of the ferment are to be mixed with a composition which could allow further action of the organisms, pasteurization of the ferment is necessary. Of course, spray drying of the ferment or drying the ferment with an edible base obviates the necessity to pasteurize the ferment. Also, where the separated solids are to age, no pasteurization should be performed.

The invention will be illustrated by the examples below; however, it should be clearly understood that the invention is fully applicable to the extent of the foregoing disclosure and it is not limited to the specific embodiments of the examples which are merely drawn to representative embodiments of the invention.

EXAMPLE 1

Production of the basic cheese flavored medium

Skim milk having 21% total solids was heated to 145° F. for thirty minutes to destroy pathogens and to reduce the number of competitive organisms. The skim milk was cooled to 100° F. and placed in an isothermal bath maintained at 100° F. The skim milk was then inoculated with *S. lactis-diacetilactis* (citrate fermenter) and *S. lactis-diacetilactis* (citrate non-fermenter), the ratio of the Bacillus organism to the Streptococcus organism was approximately 60/40. The inoculated skim milk was stirred for 35 minutes to disperse the organisms therein. The inoculated skim milk was then sealed in an airtight container having ⅓ of its volume as a head space and allowed to remain at 100° F. for five days during which the skim milk was fermented and gases were contained in the head space. Thereafter, the container was opened and the pressurized gases in the head space of the liquid medium were allowed to escape. This product was then suitable for further fermentation according to the present invention.

EXAMPLE 2

The ferment of Example 1 was maintained at 77° F. and inoculated with *Penicillium roquefortii*. The ferment was further fermented for 5 days with aeration at that temperature. The resulting ferment was divided into three parts, one part was pasteurized at 145° F. for 30 minutes and cooled. One part was not pasteurized but immediately spray dried to produce a blue cheese flavored powder. The whey of the third unpasteurized part was separated from the solids; the solids were pressed and cubed to produce an unaged blue cheese.

EXAMPLE 3

The unaged cheese of Example 2 was ripened at 70° F. for 30 days and produced an excellent blue cheese.

EXAMPLE 4

The whey of the pasteurized part of Example 2 was separated from the solids and a portion of the solids were spray dried to produce a blue cheese powder of excellent taste. The other portion of the solids was pressed and portions of the pressed solids were mixed, serially, with partially hydrogenated corn oil, sour cream, soya protein, and an unaged cheese base to produce respectively a dip, salad dressing, cheese flavor, and blended cheese, all of which had an excellent blue cheese flavor.

EXAMPLE 5

On a dry basis was mixed 50% of the spray dried solids of Example 2, 31.3% acid whey powder, 4% salt, 5% disodium phosphate (a dispersing agent), 1% blue-green food coloring, the remainder being dry milk solids. After thorough mixing, a portion thereof was dispersed with vigorous stirring in water and spray dried to form a blue cheese powder suitable for use with dips, salads, etc. The cheese powder was a fine textured powder having a very distinctive and medium degree of blue cheese flavor.

EXAMPLE 6

A second portion of the product of Example 5 was mixed with an equal portion by weight of unaged cheese curds and a blue cheese spread of mild blue cheese flavor was obtained.

EXAMPLE 7

A third portion of the product of Example 5 was mixed with an equal portion of partially hydrogenated vegetable fats and produced a mild blue cheese dip.

EXAMPLE 8

Equal portions of the product of Example 5 and whey solids were mixed to produce the medium mild blue cheese flavor powder for sprinkling on salads and the like.

EXAMPLE 9

On a dry weight basis, there was mixed 48% of the dried solids of Example 5 and 50% of naturally aged blue cheese, the remainder being salt, disodium phosphate and blue-green cheese coloring. This product after being thoroughly mixed was spray dried and produced a blue cheese powder of very excellent and intense flavor.

EXAMPLE 10

The ferment of Example 1 was inoculated with a suspension of aged cheddar cheese and further fermented in an airtight container for 6 days at 100° F. A first portion of the further ferment was spray dried to produce a cheddar cheese flavored powder. A second portion was formed into cubes according to the procedure of Example 2 and aged for 30 days to produce a cheddar cheese. A third portion was pasteurized at 145° F. for 30 minutes and produced a liquid cheddar cheese flavored composition. A portion of the liquid composition was spray dried to produce a cheddar cheese flavored powder.

EXAMPLE 11

On a dry weight basis, there was mixed 50% of the fermented solids of Example 10, 6% aged cheddar cheese, 16.3% acid whey powder, 15% butter fat, .5% atmos 150 (monoglycerided emulsifier) and the remainder being salt, disodium phosphate and USDA Yellow No. 5. This product after being thoroughly mixed was cut into wedges and produced an excellent cheddar cheese.

EXAMPLE 12

A portion of the cheese of Example 10 was spray dried and produced a cheddar cheese powder of intense flavor.

EXAMPLE 13

The procedures of Examples 10 through 12 were repeated except that the ferment was inoculated with Proprionobacter instead of cheddar cheese and the solids were mixed with Swiss cheese instead of cheddar cheese. The products produced had a medium to strong Swiss cheese flavor.

EXAMPLE 14

The procedures of Examples 10 through 12 were repeated except that the ferment was inoculated with Italian cheese instead of cheddar cheese. The fermentation was carried out under anaerobic to microaerophillic conditions instead of in an airtight container and solids were mixed with Italian cheese instead of cheddar cheese. The products produced had a mild to medium Italian cheese flavor.

EXAMPLE 15

This example illustrates a further embodiment of the invention, in that the inoculant is obtained from the indigenous organism population. The ferment produced by Example 1 was precipitated, pressed into curds and placed in a room which had been used for aging of blue cheese. The pressed curds were allowed to age at room temperature for two months and a mild blue cheese was produced. The blue cheese flavor developed from the organisms indigenous to the room and without specifically inoculating the ferment as in the foregoing examples.

Of course this indigenous inoculating of the curds can be accomplished with organisms other than blue cheese organisms, e.g. Mucor (Brie cheese), Italian cheese organisms, Swiss cheese organisms, etc.

As can be seen from the above disclosure, the basic improvement of this invention is that of producing cheese flavors by providing an aqueous medium of at least one protein and one carbohydrate, inoculating the medium with non-toxic organisms of the genus Bacillus and non-toxic organisms from the genus Streptococcus, allowing the medium to ferment and thereafter inoculating the ferment with a specific cheese flavor organism and allowing growth of the specific cheese flavor organisms. Thereafter the resulting product may be further processed by drying, mixing with natural or synthetic cheese flavors, edible bases, etc. As used in this specification the terms "specific cheese flavor organisms" mean those organisms which are known to produce specific cheese flavors and may be the isolated organisms or the organisms naturally occurring in the specific cheese, e.g. Swiss cheese, cheddar cheese, blue cheese, etc. Of course, the particular conditions of growth of the specific cheese flavor organisms should be chosen to promote the growth thereof, and these conditions are well known to the art and are disclosed in various technical publications including those noted above.

The ferment with the specific cheese flavor organisms therein should be allowed to further ferment for a time to develop the organisms sufficiently to produce the specific cheese flavor, e.g. until the composition contains at least 1000, especially 10,000 or more flavor organisms per gram of composition.

We claim:

1. In a cheese flavor composition which is a pasteurized aqueous medium containing the growth products of a combination of microorganisms, said medium having at least one protein and at least one carbohydrate therein and containing a symbiotic combination consisting essentially of at least 10 organisms per gram of the medium of at least one first non-toxic member selected from the genus Bacillus and at least 10 organisms per gram of the medium of at least one second non-toxic member selected from the genus Streptococcus, the improvement wherein the composition also contains specific cheese flavor organisms sufficiently developed to provide a specific cheese flavor.

2. The composition of claim 1 wherein the Bacillus is selected from the group consisting of *Bacillus alvei, cereus, cereus* var. *mycoides, megaterium, megatherium, subtilis, subtilis* var. *aterrimus* and *subtilis* var. *niger*.

3. The composition of claim 1 wherein the Streptococcus is selected from the group consisting of *Streptococcus cremoris, durans, faecalis* and *lactis*.

4. The composition of claim 1 wherein the Bacillus is both *Bacillus megaterium* and *Bacillus megatherium* and the Streptococcus is both *Streptococcus S. lactis*-variation *diacetilactis* (citrate fermenter) and *S. lactis-diacetilactis* (citrate non-fermenter).

5. The composition of claim 1 having at least 10,000 organisms per gram of composition of each of the said members and said specific cheese flavor organism.

6. The composition of claim 5 in a dried form.

7. The composition of claim 1 wherein the said aqueous medium is at least in part a milk product.

8. The composition of claim 7 wherein the milk product is selected from whole milk, skim milk and milk solids.

9. The composition of claim 8 wherein the milk product is skim milk.

10. In a process for producing a cheese flavor by pasteurizing an aqueous medium containing a protein and a carbohydrate, inoculating the pasteurized aqueous medium with a combination consisting essentially of at least 10 non-toxic organisms per gram of medium of the genus Bacillus and at least 10 non-toxic organisms per gram of medium of the genus Streptococcus, and growing the combination of organisms until a symbiotic relationship of the organisms is established and until a cheese flavor develops, the improvement comprising inoculating the resulting growth product with a specific cheese flavor organism and further growing the specific organism until a specific cheese flavor also develops.

11. The process of claim 10 wherein the ratio of the organism of the genus Bacillus to the organisms of the genus Streptococcus is between 25:75 and 75:25, respectively.

12. The process of claim 10 wherein the Bacillus is selected from the group consisting of *Bacillus alvei, cereus, cereus* var. *mycoides, megaterium, megatherium, subtilis, subtilis* var. *aterrimus* and *subtilis* var. *niger*.

13. The process of claim 10 wherein the Streptococcus is selected from the group consisting of *Streptococcus cremoris, durans, faecalis* and *lactis*.

14. The process of claim 10 wherein the organisms are grown at temperatures between 85° F. and 130° F.

15. The process of claim 10 wherein the medium is pasteurized after the specific cheese flavor develops.

16. The process of claim 10 wherein the aqueous medium is pasteurized at a temperature of at least 145° F. for 30 minutes, and the pasteurized medium is cooled to between 130° F. and 60° F. prior to said inoculating step.

17. The process of claim 16 wherein after the first inoculation step, the medium is kept in an airtight container at 60° F. to 130° F. for up to 5 days whereby the medium ferments, and after the second inoculating step, the medium is further fermented at 40° to 130° F.

18. The process of claim 10 wherein the Bacillus is both *Bacillus megaterium* and *Bacillus megatherium* and the Streptococcus is both *Streptococcus lactis*-variation *diacetilactis* (citrate fermenter) and *S. lactis*-variation *diacetilactis* (citrate non-fermenter).

19. The process of claim 18 wherein the pasteurized medium is cooled to a temperature between 60° F. and 130° F. and subsequently inoculated with the said combination of organisms and grown at said temperature ranges.

20. The process of claim 19 wherein the temperature range is 85° F. to 130° F.

21. A process of claim 10 wherein the aqueous medium is at least in part a milk product.

22. The process of claim 21 wherein the milk product is selected from whole milk, skim milk and milk solids.

23. The process of claim 22 wherein the milk product is skim milk.

24. The process of claim 22 wherein the medium contains from 4% to 35% total solids.

25. The process of claim 10 wherein after the first inoculating step the said medium is allowed to ferment until a symbiotic relationship of the organisms is established and the further ferment is carried out for up to 20 days.

26. The process of claim 25 wherein the medium is further fermented for about at least 3 days.

27. The process of claim 26 wherein the medium is further fermented for about 3 to 5 days.

28. The composition of claim 25 in admixture with an edible base.

29. The composition of claim 28 wherein the edible base is a cheese, milk or milk fraction, fat or synthetic cheese flavor.

30. The composition of claim 28 wherein the edible base is a natural cheese.

31. The composition of claim 30 in a dried form.

32. The composition of claim 30 wherein the natural cheese is cheddar cheese, blue cheese, Roquefort cheese, Swiss cheese, or Italian cheese.

33. The composition of claim 32 in a dried form.

34. The composition of claim 32 wherein the cheese is cheddar cheese.

References Cited

UNITED STATES PATENTS

| | | | |
|---|---|---|---|
| 2,805,950 | 9/1957 | Erekson | 99—116 |
| 3,072,488 | 1/1963 | Watts | 99—115 |
| 3,159,490 | 12/1964 | Hussong | 195—96 |
| 3,365,303 | 1/1968 | Hedrick | 99—116 |
| 3,483,087 | 12/1969 | Christensen | 195—96 |
| 3,507,750 | 3/1970 | Murray | 99—116 X |

JOSEPH SCOVRONEK, Primary Examiner

S. MARANTZ, Assistant Examiner

U.S. Cl. X.R.

99—115, 116; 195—96